United States Patent

[11] 3,624,207

[72] Inventor George A. Buntin
 Faulkland, Wilmington, Del.
[21] Appl. No. 743,046
[22] Filed July 8, 1968
[45] Patented Nov. 30, 1971
[73] Assignee Hercules Incorporated
 Wilmington, Del.
 Original application Sept. 30, 1963, Ser. No. 312,305, now abandoned. Divided and this application July 8, 1968, Ser. No. 743,046

[54] NEMATOCIDAL USE OF 2,3,4,6-TETRACHLOROPHENYL N-METHYLCARBAMATE
 1 Claim, No Drawings

[52] U.S. Cl. .................................................. 424/300
[51] Int. Cl. ........................................ A01n 9/20
[50] Field of Search ............................... 424/300

[56] References Cited
UNITED STATES PATENTS
2,933,383  4/1960  Lambrech ..................... 71/2.6

OTHER REFERENCES
Koibenzen et al., " J. Ag & Food Chem.," Vol. 2, pp. 864–867 (1954).

Primary Examiner—Albert T. Meyers
Assistant Examiner—Vincent T. Turner
Attorney—George H. Hopkins ABSTRACT: Disclosed is the use of 2,3,4,6-tetrachlorophenyl N-methylcarbamate as a nematocide.

NEMATOCIDAL USE OF 2,3,4,6-TETRACHLOROPHENYL N-METHYLCARBAMATE

The application is a divisional of the application, Ser. No. 312,305, filed Sept. 30, 1963, now abandoned, for Tetrachlorophenyl N-methylcarbamate and Use as a Nematocide.

This invention relates to 2,3,4,6-tetrachlorophenyl N-methylcarbamate and to its use as a nematode toxicant.

In accordance with the present invention, it has been found that 2,3,4,6-tetrachlorophenyl N-methylcarbamate is a new compound which when employed as the active ingredient in the control of nematodes exhibits excellent activity. It is particularly effective in controlling plant-parasitic nematodes in a soil infested therewith.

2,3,4,6-tetrachlorophenyl N-methylcarbamate is represented by the following structural formula

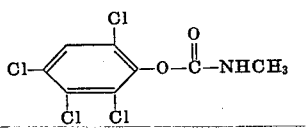

and may be prepared by the reaction of the corresponding tetrachlorophenol with methyl isocyanate. The compound of the invention may be also prepared by the reaction of N-methylcarbamyl chloride with 2,3,4,6-tetrachlorophenol or by the reaction of 2,3,4,6-tetrachlorophenylchlorocarbonate with methylamine. The preparation of the tetrachlorophenol starting material may follow any of the well-known prior art processes such as chlorinating phenol in the presence of a catalyst or contacting tetrachlorom-hydroxybenzoic acid with calcium at increased temperatures.

The preparation of the compound of this invention and its use as a nematocide is illustrated in the following examples. All parts are by weight

EXAMPLE 1

Ten parts of 2,3,4,6-tetrachlorophenol was dissolved in 19.8 parts of acetone. About one part of triethylamine was added as catalyst. To the resulting solution three parts of methyl isocyanate was added slowly with cooling The reaction mixture was maintained at room temperature for twenty-four hours. The acetone then was removed, and the solid residue remaining was slurried with hexane, filtered, washed with additional hexane, and dried. Eleven and one-tenth parts, a yield of 89 percent of theory, of white crystalline solid was obtained. It had a melting point of 159°–60° C., and analyzed 4.9 percent N compared to the calculated value of 4.85 percent N for 2,3,4,6-tetrachlorophenyl N-methylcarbamate.

EXAMPLE 2

In four parts of acetone was dissolved 0.24 parts of the 2,3,4,6-tetrachlorophenyl N-methylcarbamate prepared in example 1. Tween 20 (a sorbitol monolaurate polyoxyethylene derivative) was added to produce a concentration, based on the weight of the solution, of about 400 parts per million of the emulsifier. To this emulsifiable concentrate five parts of water was added to form an emulsion which was then further diluted to 110 parts with distilled water. From the above stock solution aliquots were taken in the amounts of 62.5 parts, 31.5 parts, and 16 parts. Each of these was diluted with distilled water to make 125 parts of emulsion which represents 52-½, 26-¼ and 13-⅛ pounds per acre treatment rates, respectively.

Soil was inoculated with second and third stage larvae of the species Meloidogyne incognita acrita. Enough inoculated soil to fill three four-inch diameter pots was placed in a pan. One hundred twenty-five parts of the emulsion, one of the aliquots prepared above, was thoroughly mixed into the soil. The pots were filled with the soil and normal watering, from the top, was carried out until the end of the test.

Seven days after treatment the soil in the pots was planted with tomato plants. Four weeks later the soil was washed from the plant roots, and the number of knots on the roots of the plants was counted. The two remaining aliquots, prepared above, were also mixed with soil and tested as above. Results are given in the following table, and include comparisons with ethylene dibromide (a compound used commercially for the control of nematodes) and an untreated control.

TABLE I

|  | Rate in pounds/ acre | Average number of knots/ plant | Damage index | Rating | Percent phytotoxicity |
|---|---|---|---|---|---|
| 2,3,4,6-tetrachlorophenyl N-methylcarbamate | 52½ | 0 | 0.0 | AA | 10 |
| Do | 26¼ | 1 | 0.97 | AA | 0 |
| Do | 13⅛ | 6 | 4.5 | A | 0 |
| Ethylene dibromide | 75 | 9.2 | 0.5 | AA | 0 |
| Control |  | 1,843 |  |  |  |

The Damage Index (D.I.) was calculated by dividing the average number of knots per plant from the three replicates of each test by the average number of knots per untreated plant. The number obtained by this division was multiplied by 100 to obtain the D.I. value.

The D.I. values were rated according to a classification ranging from AA (highly effective) to X (ineffective) and these ratings used to report the nematocidal activity of the materials tested. The classification used is shown in the following table.

TABLE II

| D.I. | Class |
|---|---|
| 0–1 | AA |
| 1.1–5 | A |
| 5.1–25 | B |
| >25.1 | X |

The phytotoxicity was taken to be the reduction in normal root development and was entered as a per cent of the normal root weight or size. Although zero per cent phytotoxicity for a test compound is preferred, up to about fifteen per cent is acceptable in the above testing procedure. In this procedure, planting is effected seven days after treatment of the soil. However, in commercial usage of a compound, ten to fourteen days is allowed after treatment and before planting. During this ten to fourteen day period, the concentration of the compound in the soil decreases to the point where phytotoxic effects are negligible.

This effect of decreasing concentration is shown in the following additional test which was carried out to measure the phytotoxicity of the compound of this invention after fourteen days. The test involved the introduction of nematode egg masses into the soil, subsequent treatment of the soil with the compound at each of the concentrations shown in table I, and planting with tomato plants fourteen days after treatment. The phytotoxicity was measured and is recorded in the following table.

TABLE III

| Compound | Rate in pounds/ acre | Percent phytotoxicity |
|---|---|---|
| 2,3,4,6-tetrachlorophenyl N-methylcarbamate | 52½ | 0 |
| Do | 26¼ | 0 |
| Do | 13⅛ | 0 |

The compound of this invention may be made into nematocidal compositions which may be in the form of emulsions, solutions, granules, dusts or wettable powders. The form of the composition depends upon how it will be applied, which in turn depends upon the type of nematode to be controlled and its place of habitat. Some nematode types inhabit the soil, whereas other types will be found on the surface of the soil. Accordingly, the type of nematode to be treated may be a factor in determining which form of the composition will be the most desirable to use.

Several methods of applying nematocidal compositions to nematode-infested soil are employed in practice. For example, if it is intended to inject the nematocidal composition into the soil, a liquid formulation, either in the form of a solution or an emulsion is most suitable. If, along with incorporating the nematocidal composition into the soil, it is desired to apply the composition to the surface for treatment thereof, several forms of the composition are acceptable, which include emulsions, dusts, wettable powders, and granules. All of the above forms are also suitable if it is desired to treat selectively a large area, such as certain rows of a crop in a large field.

In the compositions of this invention, the active agent should be present in nematocidally effective amounts. The amount of active nematocidal agent which may be present in the diluted nematocidal compositions of this invention will depend upon the form of the composition. Generally, however, between about 0.5 percent to about 15 percent by weight of nematocidally active agent, based on the weight of the total composition, will be used.

Any of the well-known pest-control chemical carriers may be employed as carriers for the nematocidally active compound of this invention. Numerous examples of such carriers are disclosed in Chemistry of the Pesticides by Donald E. H. Frear, Third Edition, pages 5–6 (1955).

Preferably, the compound of this invention may be used as an aqueous emulsion, and a concentrated composition for dilution may thus comprise the compound in admixture with an organic solvent and, optionally, a surface-active agent. Organic solvents suitable for use herein include xylene, toluene, acetone, alcohols, aliphatic hydrocarbons and the like. The surface-active agents may be any of the well-known organic anionic, cationic, or nonionic surface-active agents commonly used in the pesticide art. Examples of such agents are disclosed in Chemistry of Insecticides, Fungicides and Herbicides by Donald E. H. Frear, Second Edition, pages 280–287 (1948).

In a preferred composition of this invention, an emulsifiable concentrate may be prepared by dissolving the active ingredient in an organic solvent followed by adding a small amount of a surface-active agent. To this emulsifiable concentrate water is added to form an emulsion which may be further diluted with water to suit the intended application. In addition to the preparation of aqueous emulsions from an emulsifiable concentrate, another preferred composition of this invention is a wettable powder prepared from these concentrates.

A concentrate of the nematocidal composition of this invention may contain from about 10 percent to about 90 percent of the nematocidally active compound based on the total weight of the concentrate. If it is desired to prepare an aqueous emulsion, then a liquid concentrate of from about 10 percent to about 40 percent of the nematocidally active compound is suitable. If, however, the desired formulation is a wettable powder, then solid concentrates containing from about 50 percent to about 90 percent of the nematocidally active compound are more suitable. If a surface-active agent is employed in the preparation of the concentrates of this invention, it will generally be present in amounts of from about one percent to about fifteen percent, based on the total weight of the concentrate, preferably from about 1 percent to about 5 percent.

The compound of this invention may be used as the sole toxic agent in nematocide formulations, or it may be used in admixture with other toxicants to supplement the properties of the nematocide formulation. Toxicants which may be used in admixture with the compound of this invention include herbicides, insecticides and fungicides.

What I claim and desire to protect by Letters Patent is:

1. A method of controlling soil nematodes, which comprises applying to said nematodes a nematocidally effective amount of 2,3,4,6-tetrachlorophenyl N-methylcarbamate.

* * * * *